(12) United States Patent
Bone

(10) Patent No.: US 9,726,846 B2
(45) Date of Patent: Aug. 8, 2017

(54) DUAL-SHOT INJECTION MOLDED OPTICAL COMPONENTS

(71) Applicant: GENIUS ELECTRONIC OPTICAL CO., LTD., Taichung (TW)

(72) Inventor: Matthew Bone, Fremont, CA (US)

(73) Assignee: GENIUS ELECTRONIC OPTICAL CO., LTD. (TW)

(*) Notice: Subject to any disclaimer, the term of this patent is extended or adjusted under 35 U.S.C. 154(b) by 276 days.

(21) Appl. No.: 14/271,239

(22) Filed: May 6, 2014

(65) Prior Publication Data
US 2015/0323757 A1     Nov. 12, 2015

(51) Int. Cl.
| G02B 7/02 | (2006.01) |
|---|---|
| G02B 3/02 | (2006.01) |
| B29D 11/00 | (2006.01) |
| G02B 5/00 | (2006.01) |

(52) U.S. Cl.
CPC .......... *G02B 7/02* (2013.01); *B29D 11/00432* (2013.01); *G02B 3/02* (2013.01); *G02B 7/026* (2013.01); *G02B 5/005* (2013.01)

(58) Field of Classification Search
CPC .......... G02B 7/02; G02B 7/026; G02B 1/041; G02B 3/02; G02B 5/005; B29D 11/00432
See application file for complete search history.

(56) References Cited

U.S. PATENT DOCUMENTS

| 6,829,109 B2* | 12/2004 | Kikuchi | ............ G02B 7/02 359/819 |
|---|---|---|---|
| 2012/0323078 A1* | 12/2012 | Kikumori | ........ B29C 45/0025 600/162 |

FOREIGN PATENT DOCUMENTS

| TW | M337077 | 7/2008 |
|---|---|---|
| TW | 201229603 | 7/2012 |

OTHER PUBLICATIONS

"Office Action from TW Application No. 10421045880, dated Aug. 5, 2015, 5 pages."

* cited by examiner

*Primary Examiner* — Joseph P Martinez
(74) *Attorney, Agent, or Firm* — Kilpatrick Townsend and Stockton LLP

(57) ABSTRACT

An optical lens assembly includes a hollow retainer having an inner surface, an object-side opening, and an image-side opening, and an optical lens integrally formed with formation of the retainer and filled a portion of the retainer. The optical lens includes an object-side surface facing toward the object-side opening, and image-side surface facing toward the image-side opening, and a lateral surface extending from the object-side surface to the image-side surface. The retainer and the optical lens are aligned along an optical axis.

22 Claims, 4 Drawing Sheets

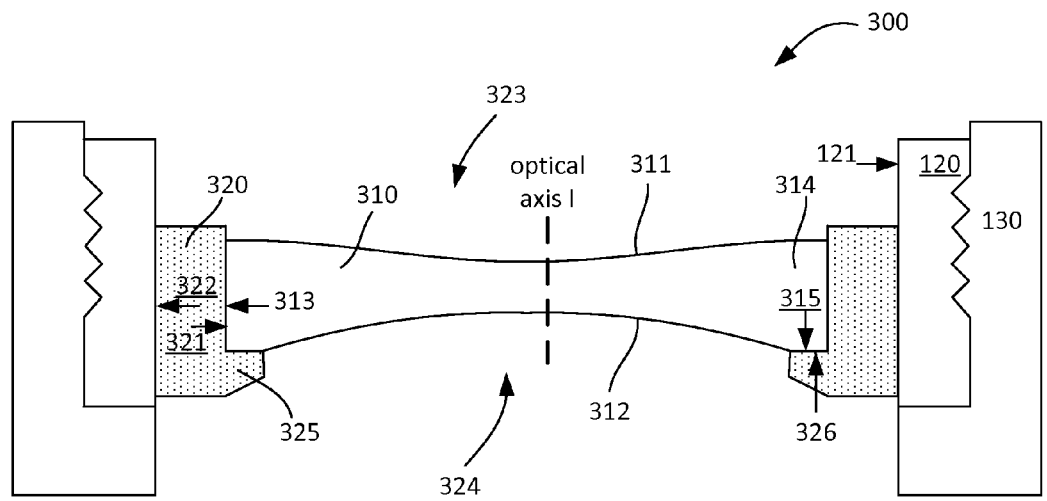
FIG. 3
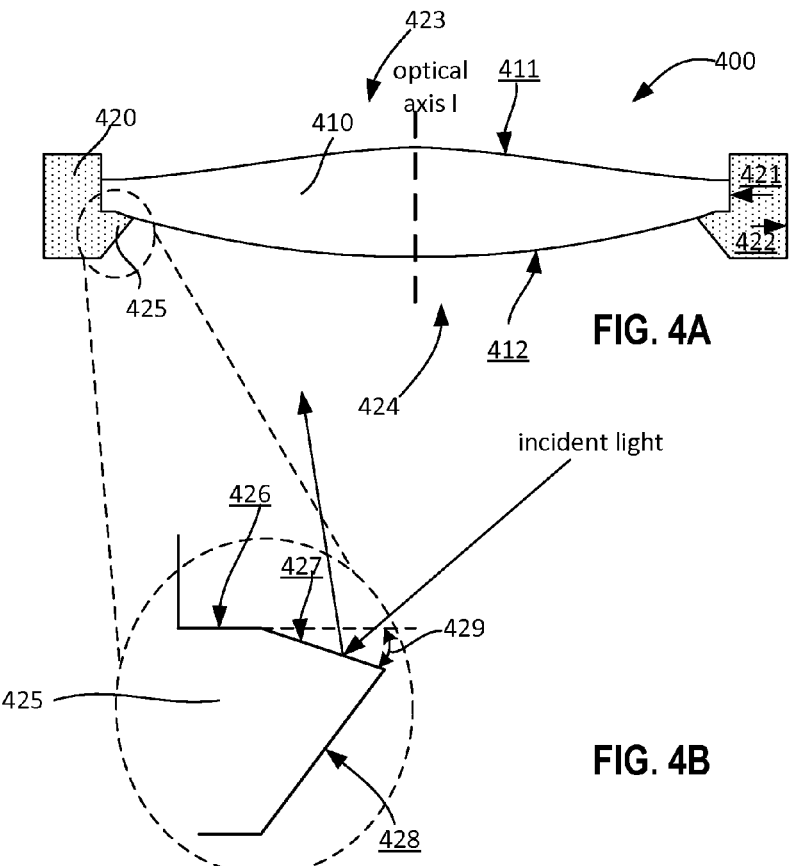
FIG. 4A
FIG. 4B

DUAL-SHOT INJECTION MOLDED OPTICAL COMPONENTS

BACKGROUND OF THE INVENTION

Optical imaging systems are commonly incorporated in personal electronic devices such as mobile phones, tablet computers, and the like. The optical imaging systems include an image sensor responsive to incident light and lens elements to direct and focus light onto the image sensor so as to form an image of an object external to the device in which the optical imaging system is incorporated. Such optical imaging systems can include multiple lens elements, and a lens barrel can be provided to hold the lens elements in alignment with each other along an optical axis. In some designs, light reflecting off a surface of the lens barrel can pass through the lenses and impinge on the image sensor. This can produce flare and other artifacts that can adversely affect image quality.

SUMMARY OF THE INVENTION

The present disclosure relates to optical lens assemblies, and more particularly to a dual-shot injection molded optical assembly.

Certain embodiments of the present invention relate to a retainer, an optical lens, and a lens barrel, that can be used in an optical imaging system (e.g., a camera). Portions of the optical lens system include an optical lens assembly. According to certain embodiments of the present invention, the optical lens assembly may include an optical lens and a retainer.

In an embodiment, an optical lens assembly may include a hollow retainer having an inner surface, an object-side opening, and an image-side opening, and optical lens having an object-side surface, an image-side surface, and a lateral surface. The lateral surface of the optical lens abuts the inner surface of the retainer. In an embodiment, the retainer may be cylindrical and is aligned with the optical lens along an optical axis.

In an embodiment, the retainer may include an annular-shaped (ring-shaped) flange disposed on the object-side surface of the optical lens. In another embodiment, the retainer may include an annular-shaped (ring-shaped) flange disposed on the image-side surface of the optical lens. The ring-shaped flange is aligned with the optical axis and may be an aperture stop of the optical lens assembly.

In an embodiment, the retainer and the flange are integrally made of an injection molded non-transparent plastic.

In another embodiment, an optical lens assembly includes a retainer having a hollow space and an outer surface, an optical lens that is formed with the formation of the retainer and filled a portion of the hollow space, and a lens barrel configured to receive the retainer. The optical lens includes an object-side surface, an image-side surface, and a side-surface extending from the object-side surface to the image-side surface. The optical lens does not have a physical contact with the lens barrel. In an embodiment, the retainer has a cylindrical inner surface, and the side surface of the optical lens is circular abutting the cylindrical hollow inner surface of the retainer. In an embodiment, the retainer and the optical lens are aligned an optical axis. In an embodiment, the retainer may include a flange that is formed concurrently with the retainer. In an embodiment, the flange may be ring-shaped having a center aligned with the optical axis and may be used as an aperture stop for the optical lens assembly.

Certain embodiments of the present invention relate to a retainer, the body of which has an inner surface to accommodate an optical lens group. The retainer has a flange with a reduced flat edge to prevent incident light from reflecting onto the image sensor to produce glare.

The following description, together with the accompanying drawings, will provide a better understanding of the nature and advantages of the claimed invention.

BRIEF DESCRIPTION OF THE DRAWINGS

FIG. 3 is a simplified cross-sectional view of an optical lens assembly according to another embodiment of the present invention.

FIG. 4A is a simplified cross-sectional view of an optical lens assembly according to yet another embodiment of the present invention.

FIG. 4B is an enlarged partial cross-sectional view of FIG. 4A.

DETAILED DESCRIPTION OF SPECIFIC EMBODIMENTS

The present invention relates to dual-shot optical lens assemblies. The dual-shot optical lens assemblies can have broad application in portable and wearable electronic devices, such as mobile phones, head mounted devices, tablet computers, and the like that use a CCD or a CMOS image sensor. Specific embodiments are described below. Those skilled in the art with access to the present disclosure will recognize that other optical lens assemblies can also be designed within the scope of the present invention.

It should be understood that the drawings are not drawn to scale, and similar reference numbers are used for representing similar elements. Various embodiments are described herein by way of example, and features described with respect to different embodiments may be combined and interchanged, without departing from the scope or spirit of the present invention.

According to the present invention, the terms "inner", "outer" indicate positions relative to an optical axis. For example, an inner surface is referred to the surface facing toward the optical axis and an outer surface is the opposite surface.

Figure 1:
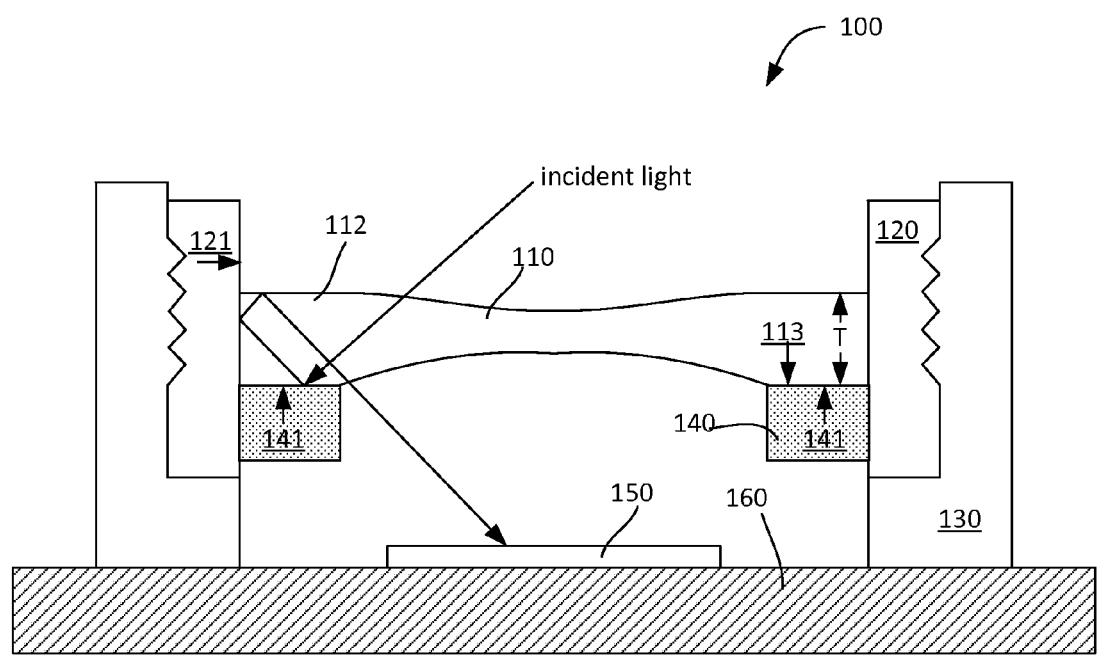
FIG. 1 is a simplified cross-sectional view of an optical lens assembly.

Optical lens assemblies are used in making an optical imaging system. FIG. 1 is a simplified cross-sectional view of an optical lens assembly 100. Optical lens assembly 100 includes an optical lens 110, a lens barrel 120, and a lens holder 130. Optical lens 110 has a flange 112 disposed at an outer periphery. Flange 112 has an annular shape formed around the entire periphery of optical lens 110. Flange 112 is integrally formed with a material identical to that of optical lens 110. Flange 112 has a relative large thickness "T" for mounting optical lens on an inner surface 121 of lens barrel 120. Optical lens assembly 100 further includes a retainer 140 having a planar surface 141 abutting the bottom planar surface 113 of lens barrel 120. Light reflecting of surface 141 of lens barrel 120 may be further reflected from inner surface 121 of lens barrel 120 and reach an image sensor 150 mounted on a substrate 160 and affect the image quality of the optical imaging system. Furthermore, the relative large thickness of flange 112 of optical lens 110 may affect the optical lens quality and increase the lens size and production cost.

Figure 2A:
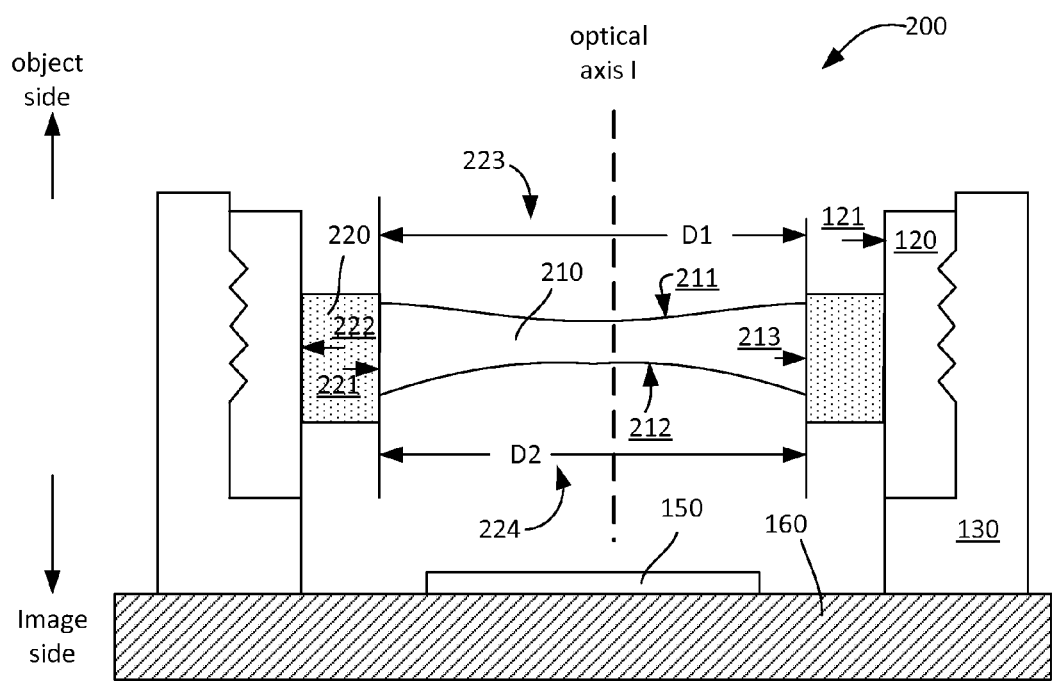
FIG. 2A is a simplified cross-sectional view of an optical lens assembly according to an embodiment of the present invention.

FIG. 2A is a simplified cross-sectional view of an optical lens assembly 200 according to an embodiment of the present invention. Optical lens assembly 200 includes an optical lens 210, a retainer 220, and a lens barrel 120 coupled to a holder 130. In an embodiment, retainer 220 is a ring structure having an inner sidewall 221 and an outer sidewall 222 (sidewall and surface are used alternatively hereinafter). Retainer 220 has an object-side opening 223 with a diameter D1 and an image-side opening 224 with a diameter D2. Object-side and image-side openings 223 and 224 are disposed opposite each other to form a light path through which light passes to irradiate an image sensor 150. Diameters D1 and D2 have the same dimension in some embodiments so that retainer 220 can be a hollow cylinder. Optical lens 210 has an object-side surface 211, an image-side surface 212, and a lateral surface 213. The lateral surface extends from the object-side surface to the image-side surface.

Lateral surface 213 is in direct contact with inner sidewall 221 of retainer 210. In an embodiment, inner sidewall 221 has a surface area equal to the surface area of lateral surface 213 of optical lens 210, i.e., inner sidewall 221 of retainer 220 and the edge of lateral surface 213 of optical lens 210 has an equal thickness. In another embodiment, inner sidewall 221 of retainer 220 has a surface area that is greater than the surface area of lateral surface 213 of optical lens 210, i.e., the retainer is thicker than the peripheral thickness of optical lens 210. In yet another embodiment, inner sidewall 221 of retainer 220 has a surface area that is smaller than the surface area of lateral surface 213 of optical lens 210, i.e., the retainer is thinner than the peripheral thickness of optical lens 210.

In an embodiment, a retainer such as retainer 220 is first made by a first injection molding process. Thereafter, the retainer is placed into a second mold having a lens-shaped cavity to form an optical lens such as lens 210 by a second injection molding process. The result is that the formed optical lens is entirely surrounded by the retainer. Thus, according to the present invention, the dual-shot injection molding technique is advantageous in the size and cost reduction of optical lenses. Furthermore, because this dual-shot injection molding technique eliminates the requirement of a flange for optical lenses, very thin optical lenses can be manufactured with enhanced optical quality. Additionally, by integrally produced the optical lens with the retainer, an axial deviation of the optical lens and the retainer is reduced and the assembly process is simplified.

In an embodiment, retainer 220 is made of an injection molded non-transparent plastic material. The non-transparent plastic material may be black.

Figure 2B:
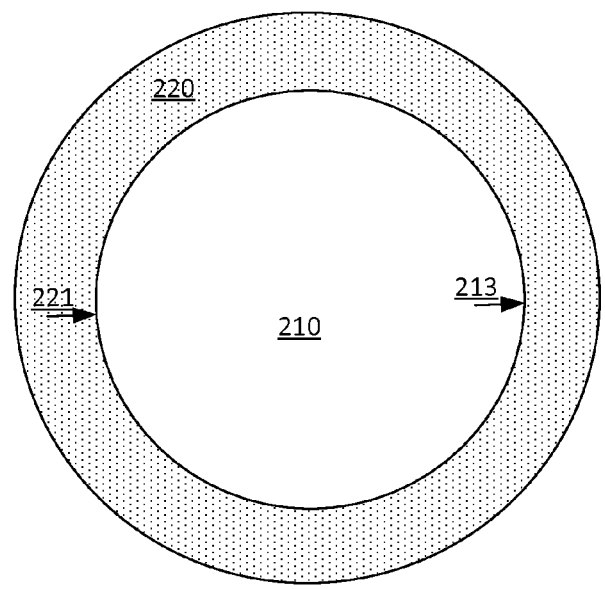
FIG. 2B is a top view of a retainer surrounding an optical lens according to an embodiment of the present invention.

FIG. 2B is a top view of a partial optical assembly including a hollow cylindrical retainer 220 that entirely surrounds optical lens 210. As shown, lateral surface 213 of optical lens 210 is in direct contact with inner sidewall 221 of retainer 220 and does not have any contact with inner surface 121 of lens barrel 120.

Thereafter, the thus obtained optical lens assembly is then mounted in barrel 120 along an optical axis I. Although one optical lens assembly (e.g., optical lens assembly 200) is shown, it is to be understood that optical lens assembly 200 can have more than one optical lens and retainer. It should be noted that optical lens assembly 200 is described with one optical lens mounted in a retainer for simplicity of illustration. Embodiments of the invention can incorporate any number of different optical lenses and associated retainers.

FIG. 3 illustrates an alternative example of an optical lens assembly 300 according to an embodiment of the present invention. Optical lens assembly 300 includes an optical lens 310 and a retainer 320 that are aligned along an optical axis I. In this embodiment, retainer 320 is a hollow cylinder having an object-side opening 323 and an image-side opening 324 and a flange 325 disposed at either one of openings 323, 324. Retainer has an inner surface 321 and an outer surface 322. In the example shown, flange 325 has an annular shape having a center aligned with the optical axis I and is integrally formed at the entire periphery of image-side opening 324. In other words, retainer 324 and flange 325 are formed in a single injection molding process. In an embodiment, retainer 324 and flange 325 are made integrally in a single injection molding process of a black plastic material (e.g., black polycarbonate). In an embodiment, the ring-shaped flange may be used as an aperture stop for the optical lens assembly.

Optical lens 310 has an object-side surface 311, an image-side surface 312, a lateral surface 313, and a peripheral portion 314 having a planar bottom 315. Lateral surface 313 abuts inner surface 321 of retainer 320. In an embodiment, inner surface 321 of retainer 320 has a surface area equal to that of lateral surface 313 of optical lens 310. In another embodiment, inner surface 321 of retainer 320 has a surface area that is greater than the surface area of lateral surface 313 of optical lens 310. In yet another embodiment, inner surface 321 of retainer 320 has a surface area that is smaller than the surface area of lateral surface 313 of optical lens 310.

Flange 325 has a planar surface 326 that is in contact with planar bottom 315 of optical lens 310. Retainer 320 and flange 325 are integrally made by a first injection molding process to form an integral retainer. Thereafter, the integral retainer is placed into a second mold having a lens-shaped cavity to form optical lens 310 by a second injection molding process. Thereafter, the retainer and the optical lens can be mounted within lens barrel 120, as shown in FIG. 3.

Because the optical lens 310 is completely surrounded by the retainer, planar bottom 315 can be made very small. Thus, according to the present invention, the dual-shot injection molding technique is advantageous in the size and cost reduction of optical lenses. Furthermore, by integrally produced the optical lens with the retainer, an axial deviation of the optical lens and the retainer is reduced and the assembly process is simplified.

FIG. 4A is a simplified cross-sectional view of an optical lens assembly 400 according to another embodiment of the present invention. Optical lens assembly 400 includes an optical lens 410 and a retainer 420. Optical lens 410 and retainer 420 are aligned along an optical axis I. In this embodiment, retainer 420 is a hollow cylinder having an object-side opening 423 and an image-side opening 424 and a flange 425 disposed at one of the two openings 423, 424. Retainer has an inner surface 421 and an outer surface 422. In this embodiment, flange 425 has an annular shape having a center aligned with the optical axis I and is integrally formed at the entire periphery of image-side opening 424. In other words, retainer 420 and flange 425 are formed in a single injection molding process. In an embodiment, retainer 420 and flange 425 may be made integrally in a single injection molding process of a black plastic material. In an embodiment, ring-shaped flange 425 may be used as an aperture stop for optical assembly 400.

FIG. 4B illustrates an enlarged partial view of flange 425 according to FIG. 4A. As shown, flange 425 has a planar surface 426 and a first oblique surface 427 that is inclined at an angle 429 less than 90 degrees with respect to planar surface 426. Because of the oblique surface, light impinging on oblique surface 427 is reflected back to object side opening 423 as stray light that will not reach image sensor 150. The oblique surface is advantageous in reducing stray light. In an embodiment, flange 425 includes a second oblique surface 428 disposed opposite first oblique surface 427 in order to reduce the reflective surface of the flange to reduce glare.

Figures 5A, 5B:
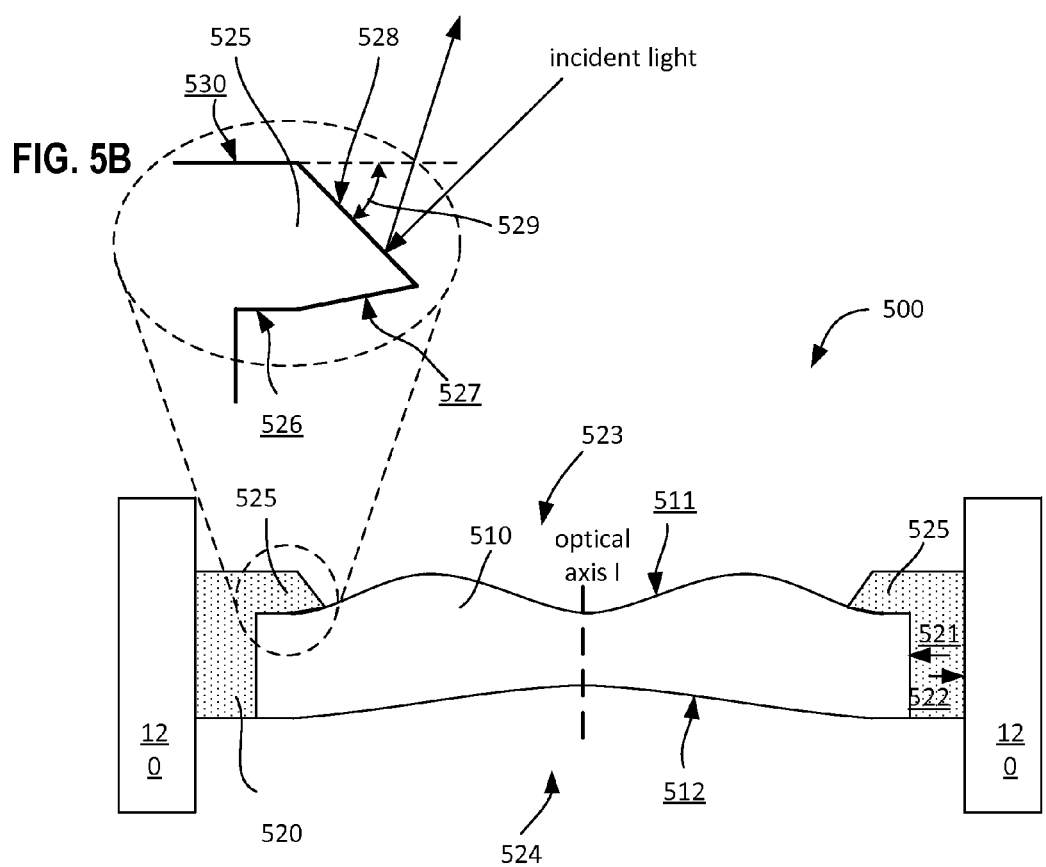
FIG. 5A is a simplified cross-sectional view of an optical lens assembly according to yet another embodiment of the present invention.
FIG. 5B is an enlarged partial cross-sectional view of FIG. 5A.

FIG. 5A is a simplified cross-sectional side view of an optical lens assembly 500 according to yet another embodiment of the present invention. Optical lens assembly 500 includes an optical lens 510 and a retainer 520 that are aligned along an optical axis I. In this embodiment, retainer 520 is a hollow cylinder having an object-side opening 523 and an image-side opening 524 and a flange 525 disposed at one of the two openings 523, 524. Retainer has an inner surface 521 and an outer surface 522. In this embodiment, flange 525 has an annular shape and is integrally formed at the entire periphery of object-side opening 523. In other words, retainer 520 and flange 525 are formed in a single injection molding process. In an embodiment, retainer 520 and flange 525 are made integrally in a single injection molding process of a black plastic material (e.g., black polycarbonate). In an embodiment, ring-shaped flange 525 has a center aligned with the optical axis I and may be used as an aperture stop for optical lens assembly 500.

FIG. 5B illustrates an enlarged partial view of flange 525 according to FIG. 5A. As shown, flange 525 has a planar surface 526 and a first surface 527 that may be curved or oblique to adapt to a peripheral edge of object-side surface 511 of optical lens 510. Flange 525 also has a second surface 528 that is declined at an angle 529 with respect to a planar surface 530. Second surface 528 is continuously sloped down toward image sensor 150. Such technique of having two oblique surfaces 527 and 528 minimizes the edge area of flange 525 and is advantageous in reduction in glare. A conventional flange would have a flat edge that can reflect incident light into the image sensor to produce glare.

Retainer 520 including flange 525 is first made by a first injection molding process. Thereafter, retainer 525 is placed into a second injection mold having a lens-shaped cavity to form optical lens 510 by a second injection molding process. The material for making retainer 520 and flange 525 may be black polycarbonate. The thus formed retainer 520 and optical lens 510 are then mounted in lens barrel 120.

The dual-shot injection process for integrally making retainers and optical lenses are described in Chinese patent application number 201310479127.1 and 201310479311.6, the contents of which are incorporated herein by reference in their entirety.

It can be known from the description of the foregoing embodiments that the retainer and the optical lens are integrally mad using a dual-shot injection process. Because the optical lens is entirely surrounded by the retainer, the axial deviation of the optical lens and retainer is reduced. Furthermore, the size and material of the optical lens are significantly reduced. As consequence, the manufacturing process is simplified, and the costs of manufacturing and materials are substantially reduced and the quality of the lens assembly is improved.

Additionally, as the flat edge of the flange is reduced or eliminated, incident light will not be reflected onto the image sensor to produce glare. In some embodiments, the flange is ring-shaped having a center aligned with the optical axis of the retainer and the optical lens and can be used as an aperture stop.

It is to be understood that, even though numerous advantageous advantages and characteristics of the present invention have been described above together with details of the structure and function of the invention, the foregoing embodiments are illustrative so as to enable a person skilled in the art to understand the principles of the present invention. The embodiments, however, are not intended to restrict the scope of the present invention, which is defined by the following claims.

What is claimed is:

1. An optical lens assembly comprising:
    a hollow retainer having a flange, an inner surface, an object-side opening, and an image-side opening; and
    an optical lens integrally formed during formation of the retainer and filling a portion of the retainer, the optical lens having an object-side surface facing toward the object-side opening, an image-side surface facing toward the image-side opening, and a lateral surface extending from the object-side surface to the image-side surface,
    wherein the retainer and the optical lens are aligned along an optical axis, and
    wherein the flange comprises a first oblique surface facing away from the optical lens,
    wherein a distance of a tip portion of the flange to the optical axis is smaller than a distance of the lateral surface of the optical lens to the optical axis in a direction perpendicular to the optical axis.

2. The optical lens assembly of claim 1, wherein the flange further comprises a planar surface and a second oblique surface inclined at an angle less than 90 degrees with respect to the planar surface.

3. The optical lens assembly of claim 2, wherein the flange surrounds a peripheral portion of the object-side surface of the optical lens.

4. The optical lens assembly of claim 2, wherein the flange surrounds a peripheral portion of the image-side surface of the optical lens.

5. The optical lens assembly of claim 2, wherein the flange has an annular shape having a center aligned with the optical axis.

6. The optical lens assembly of claim 2, wherein the second oblique surface is disposed opposite the first oblique surface and faces toward the optical lens.

7. The optical lens assembly of claim 6, wherein the first oblique surface and the second oblique surface are arranged relative to each other at an acute angle.

8. The optical lens assembly of claim 1, wherein the retainer and the flange are integrally made of a same injection molded non-transparent plastic.

9. The optical lens assembly of claim 8, wherein the non-transparent plastic comprises a black material.

10. The optical lens assembly of claim 1, wherein the retainer comprises an injection molded non-transparent plastic.

11. The optical lens assembly of claim 1, wherein the inner surface of the retainer is substantially equal to the lateral surface of the optical lens.

12. The optical lens assembly of claim 1, wherein the inner surface of the retainer is smaller than the lateral surface of the optical lens.

13. The optical lens assembly of claim 1, wherein the inner surface of the retainer is greater than the lateral surface of the optical lens.

14. The optical lens assembly of claim 1, wherein the object-side opening and the image-side opening have a same diameter.

15. The optical lens assembly of claim 1, further comprising:
- a lens barrel configured to receive the optical lens and the retainer along an optical axis.

16. An optical lens assembly comprising:
- a retainer having a flange, a hollow space and an outer surface;
- an optical lens integrally formed with formation of the retainer and filled a portion of the hollow space, the optical lens having an object-side surface facing toward the object-side opening, an image-side surface facing toward the image-side opening, and a lateral surface extending from the object-side surface to the image-side surface; and
- a lens barrel configured to receive the retainer, wherein the optical lens is free from physical contact with the lens barrel,
- wherein the flange comprises a first oblique surface facing away from the optical lens, and
- wherein a distance of a tip portion of the flange to the optical axis is smaller than a distance of the lateral surface of the optical lens to the optical axis in a direction perpendicular to the optical axis.

17. The optical lens assembly of claim 16, wherein the flange is annular-shaped and concurrently formed with the retainer, the flange further comprising a planar surface and a second oblique surface inclined at an angle less than 90 degrees with respect to the planar surface.

18. The optical lens assembly of claim 17, wherein the flange surrounds a peripheral portion of the image-side surface of the optical lens.

19. The optical lens assembly of claim 17, wherein the flange surrounds a peripheral portion of the object-side surface of the optical lens.

20. The optical lens assembly of claim 17, wherein the flange is a ring-shaped aperture stop having a center aligned with the optical axis.

21. The optical lens assembly of claim 17, wherein the retainer and the flange are integrally made of a same injection molded black plastic material.

22. The optical lens assembly of claim 16, wherein the hollow space has an inner surface substantially equal to the lateral surface of the optical lens.

* * * * *